(12) United States Patent
Kaminski (10) Patent No.: US 9,681,609 B2
(45) Date of Patent: Jun. 20, 2017

(54) GARDEN PLOT WATERING ENCLOSURE

(71) Applicant: Michael Anthony Kaminski, Ste. Anne (CA)

(72) Inventor: Michael Anthony Kaminski, Ste. Anne (CA)

( * ) Notice: Subject to any disclaimer, the term of this patent is extended or adjusted under 35 U.S.C. 154(b) by 161 days.

(21) Appl. No.: 14/481,173

(22) Filed: Sep. 9, 2014

(65) Prior Publication Data

US 2016/0066518 A1  Mar. 10, 2016

(51) Int. Cl.
*A01G 13/10* (2006.01)
*A01G 25/02* (2006.01)
*A01G 25/16* (2006.01)

(52) U.S. Cl.
CPC .......... *A01G 25/02* (2013.01); *A01G 25/16* (2013.01)

(58) Field of Classification Search
CPC ........ A01G 13/00; A01G 13/10; A01G 25/00; A01G 2/02; A01G 25/16; A01G 25/1655; B05B 15/025; B05B 15/06; B05B 15/061; B05B 15/062
USPC ... 239/1, 11, 66, 67, 70, 106, 110, 112, 207, 239/266, 273, 276, 280, 289, DIG. 15; 256/1; 47/48.5
See application file for complete search history.

(56) References Cited

U.S. PATENT DOCUMENTS

| | | | |
|---|---|---|---|
| 2,940,466 A * | 6/1960 | Speights | A01G 25/00 137/356 |
| 2,969,185 A | 1/1961 | Geiger | |
| 3,079,089 A | 2/1963 | Tomayer | |
| 3,425,630 A * | 2/1969 | Fessler, Sr. | A01G 25/00 137/356 |
| 3,701,477 A * | 10/1972 | Matt et al. | B05B 15/062 239/276 |
| 3,933,311 A * | 1/1976 | Lemelson | B05B 1/18 239/276 |
| 3,991,939 A * | 11/1976 | Maclay | A01G 25/167 137/624.11 |
| 4,190,201 A | 2/1980 | Geiger | |
| 4,948,568 A | 8/1990 | Chessmore et al. | |
| 5,007,587 A * | 4/1991 | Daroca | B05B 15/062 239/276 |
| 6,161,362 A * | 12/2000 | Forbis, Sr. et al. | F24F 5/0075 47/21.1 |
| 6,173,906 B1 * | 1/2001 | Von Kerens | E04H 17/1413 239/273 |
| 7,306,167 B2 | 12/2007 | Colarusso et al. | |
| 7,654,473 B2 | 2/2010 | Hibberd | |

(Continued)

FOREIGN PATENT DOCUMENTS

| | | |
|---|---|---|
| CA | 1 233 425 A | 3/1988 |
| CA | 2012331 A1 | 3/1990 |
| CA | 2 404 410 A1 | 3/2004 |

*Primary Examiner* — Darren W Gorman
(74) *Attorney, Agent, or Firm* — Richard D. Okimaw (57) ABSTRACT

The application discloses a unique technique for watering a garden. This technique involves application of a watering system. This system provides an enclosure about the garden plot that includes a barrier permissive of light and air to the garden plot and at least partly preventing entry of land animals of interest to the garden plot. The garden plot is watered through a number of misting nozzles connected to the enclosure and held above the garden plot. Water is distributed to the misting nozzles with a conduit loop. Multiple conduit loops may be included to disburse the water.

13 Claims, 5 Drawing Sheets

(56) References Cited

U.S. PATENT DOCUMENTS

| | | |
|---|---|---|
| 7,823,800 B1 | 11/2010 | Kalpakoff et al. |
| 2003/0177841 A1 | 9/2003 | Skinner |
| 2004/0188544 A1 | 9/2004 | Pavlik |
| 2005/0039390 A1 | 2/2005 | Sharples et al. |
| 2005/0279856 A1* | 12/2005 | Nalbandian et al. .. A01G 25/02 239/76 |
| 2008/0067263 A1 | 3/2008 | Modlin et al. |
| 2012/0097759 A1 | 4/2012 | Vigne |
| 2015/0097052 A1* | 4/2015 | Lawhorn ............... B08B 9/0328 239/112 |

* cited by examiner

GARDEN PLOT WATERING ENCLOSURE

BACKGROUND

The present invention relates to gardening equipment and more particularly, but not exclusively, relates to devices, techniques, methods, and systems suitable for enclosing and watering a garden plot.

There are many schemes for the watering of gardens. One approach utilizes a standard water sprinkler to apply water to a garden space. Unfortunately, such devices often apply too much water to some areas and not enough to others. As a result, such schemes are often very inefficient when it comes to the proper delivery and distribution of water to a garden. Likewise, relying on rainfall often delivers too much or not enough water—or is often ill-timed. Particularly in the spring, heavy rainfall often makes it too soggy to work properly, which delays planting times. This delay is particularly troublesome in more northern areas where the growing season may be extremely limited. In addition, just when plants emerge from the soil there are too often various land animals that rob the grower of such plants and/or consume later blooms, vegetables, or fruits of various plantings. Accordingly, current schemes can leave a lot to be desired, making it difficult to readily and consistently obtain a satisfactory result. Thus, there is an ongoing demand for further contributions in this area of technology.

SUMMARY

One embodiment of the present application includes a unique technique for economically watering gardens through the distribution of misting nozzles. Quite often, this technique finds application in the extension of the growing season. Alternatively or additionally, techniques of the present invention secure the garden from land animals of interest, such as deer, squirrels, rabbits, rodents, or the like by providing an enclosure that at least partially excludes them, while permitting entry of sunlight and air.

Another embodiment of the present application is a unique watering enclosure for a garden plot. This enclosure comprises a frame including at least three vertically extending support members separated from each other about the garden plot; three or more horizontally extending members to define an enclosing frame; and a mesh grating applied in one or more pieces to extend between the vertically extending support members and the horizontally extending support members. This grating is permissive of air and light to the garden plot and at least partly exclusive of land animals of interest. In one preferred form, the enclosure is at least 1.3 meters tall. In a more preferred form, the enclosure is at least 2 meters tall.

Alternatively or additionally, this apparatus includes a watering system that comprises: at least three misting nozzles positioned about the garden plot and attached to the enclosure; a number of vertically extending conduit portions each attached to one of the vertical support members and being in fluid communication with one or more of the misting nozzles to supply water thereto; and at least one supply conduit in fluid communication with the vertically extending conduit portions to selectively provide the water thereto.

This apparatus may optionally vary by additionally or alternatively including: each of the vertically extending conduit portions in fluid communication with one of a number of first conduit junctions, the first junctions each being in fluid communication with at least one of a number of horizontally extending conduit portions, each of the horizontally extending conduit portions being in fluid communication with one of the misting nozzles, and at least some of the junctions and at least some of the first horizontally extending conduit portions cooperating to define a first fluid communication loop feeding the misting nozzles.

A further embodiment of the present application is directed to a misting system for a garden plot. This system includes: a supply conduit; a valve in fluid communication with the supply conduit; a number of first distribution conduit portions in fluid communication with the valve; a number of first junction members splitting a fluid input to at least two fluid outputs, and/or a number of misting nozzles each in fluid communication with at least one of the first distribution conduit portions. The first junction members are each in fluid communication with two of the first distribution conduit portions. The junction members and the first distribution conduit portions are arranged in a closed loop of fluid communication, the misting nozzles each extending from the loop about the garden plot.

Optionally, this embodiment may include: an enclosure including a frame with a number of vertically extending members and a number of horizontally extending members structured to surround the garden plot, and grating coupled to the frame permissive of air and light to the garden plot and exclusive of land animals of interest from the garden plot; a number of second fluid junctions; a number of second distribution conduit portions each in fluid communication with at least one of the second junctions to define a second fluid communication loop; and/or a number of third distribution conduit portions each vertically extending between the first loop and the second loop to supply liquid from the first loop to the second loop for output by the misting nozzles, the third distribution conduit portions each being coupled to a different one of the first junctions and a different one the second junctions.

Still another embodiment alternatively or additionally includes: a liquid supply subsystem having a back flow preventer, a drain down valve, and/or a blow-out valve.

Yet a further embodiment comprises: providing an enclosure about the garden plot, the enclosure including a barrier permissive of light and air to the garden plot and preventing entry of land animals of interest to the garden plot; watering the garden plot through a number of misting nozzles connected to the enclosure to be held above the garden plot; distributing liquid to the misting nozzles with a first conduit loop to water the garden plot; directing the liquid to the first loop from a second conduit loop in fluid communication with the first loop, the first loop being positioned above the second loop; and/or supplying the liquid to the second loop from a liquid supply conduit. Alternative embodiments include more or fewer conduit loops to disburse liquid.

Still other forms, embodiments, applications, techniques, objects, benefits, advantages, and variations will become apparent from the description and figures provided herewith.

DETAILED DESCRIPTION OF REPRESENTATIVE EMBODIMENTS

For the purposes of promoting an understanding of the principles of any invention provided herein, reference will now be made to the embodiments illustrated in the drawing (s) and specific language will be used to describe the same. It will nevertheless be understood that no limitation of the scope of any invention is thereby intended. Any alterations and further modifications in the described embodiments, and any further applications of the principles of the same as described herein are contemplated as would normally occur to one skilled in the art to which they relate.

One embodiment of the present application is a unique technique for watering a garden plot. This technique includes an enclosure about the garden plot with a barrier permissive of light and air to the garden plot and that reduces the likelihood of entry of land animals of interest to the garden plot. In one preferred version, this barrier is in the form of a mesh grating. The garden plot is watered through a number of misting nozzles connected to the enclosure and held above the garden plot. Water is distributed to the misting nozzles with a conduit loop.

Another embodiment of the present application is provided in the form of system 20 of FIGS. 1-5. System 20 includes eleven-sided enclosure 22. FIGS. 1-4 depict a top, a bottom, an interior side view, and an exterior side view; respectively, of enclosure 22 in partial diagrammatic form. Some of the reference numerals first appearing in one of the FIGS. 1-4 may be further explained in connection with the text accompanying one or more of the other FIGS. 1-4, but are included in two or more of FIGS. 1-4 to enhance understanding. Furthermore, the size of some features may be exaggerated and/or schematically represented to enhance clarity; a feature that appears more than once in any one of FIGS. 1-5 may not be specifically designated by reference numeral for each occurrence to preserve clarity; and not all like features appearing in different FIGS. 1-5 may be specifically designated by reference numeral for each occurrence to improve clarity.

Enclosure 22 is open at the top and bottom (see FIGS. 1 and 2 for example) with side walls formed from eleven rectangular panels 24. Enclosure 22 is structured for placement of its lower portion (bottom) to rest on the ground and surround soil 21 for a garden plot 72. In the top view of FIG. 1, soil 21 and garden plot 72 are designated by reference numeral, while soil 21 and garden plot 72 are absent from the bottom view of FIG. 2 to enhance clarity. Panels 24 each have approximately the same dimensions, and are arranged collectively to define an eleven-sided polygon profile, as perhaps best illustrated in FIGS. 1 and 2. It should be appreciated that a polygon with eleven sides and eleven angles is also known as a hendecagon or an undecagon. Panels 24 are set at an angle from one to the next to lay out an interior angle of about 147.3 degrees between each different pair of adjacent panels 24; such that the sum of the interior angles is about 1620 degrees (=180*(n−2), where "n" is the number of sides). For a regular hendecagon/undecagon-type polygon having equal sides and equal interior angles, eleven equal line segments can be drawn that each extend from a different one of the polygon's eleven vertices to meet at the same interior point in the center of the polygon. So drawn, an angle of about 32.7 degrees is defined between each pair of adjacent line segments; such that eleven generally equal angles result totaling about 360 degrees. Being in an opposing position, each panel 24 subtends a different one of these approximately 32.7 degree angles.

The depicted eleven-sided enclosure 22 is a more preferred embodiment of the present application. A preferred embodiment has between three and nine sides. Another preferred embodiment has ten sides. Still other embodiments provide for a differently shaped or structured enclosure with more or fewer sides, a curved shape, a cylindrical shape, a combination of these, or such other sides/shapes as would occur to those skilled in the art.

Referring generally to FIGS. 1-4, panel 24 is further described; where like reference numerals refer to like features previously described. The top portion of each panel 24 includes a different upper horizontally extending support member 66 (see, for example, FIGS. 1, 3, and 4). The opposing lateral ends of each panel 24 each include vertically extending support member 76. For each panel 24, upper support member 66 is rigidly joined at the top of the corresponding pair of support members 76 to bridge thereacross. Accordingly, upper support member 66 functions as a crossbeam and the respective pair of support members 76 function as columns or uprights for each panel 24.

Figure 2:
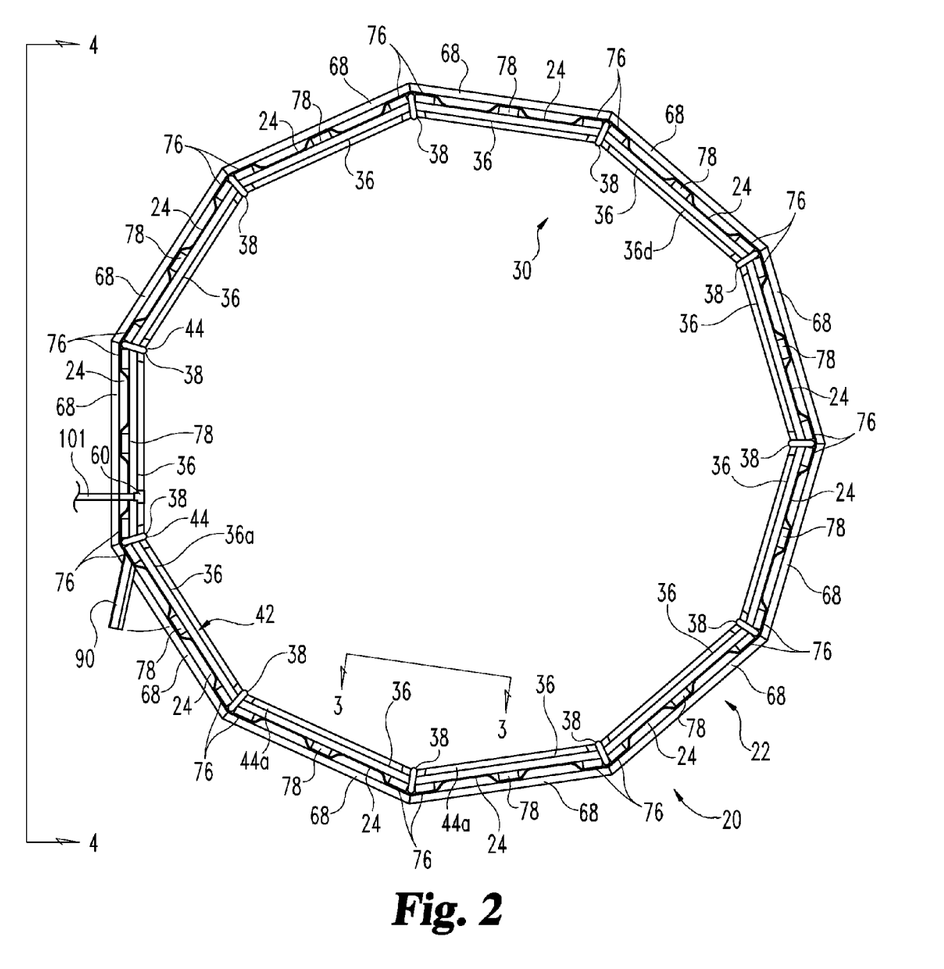
FIG. 2 is a partially diagrammatic bottom view of the enclosure of FIG. 1 and omits the soil shown in FIG. 1 to enhance clarity.
Figure 3:
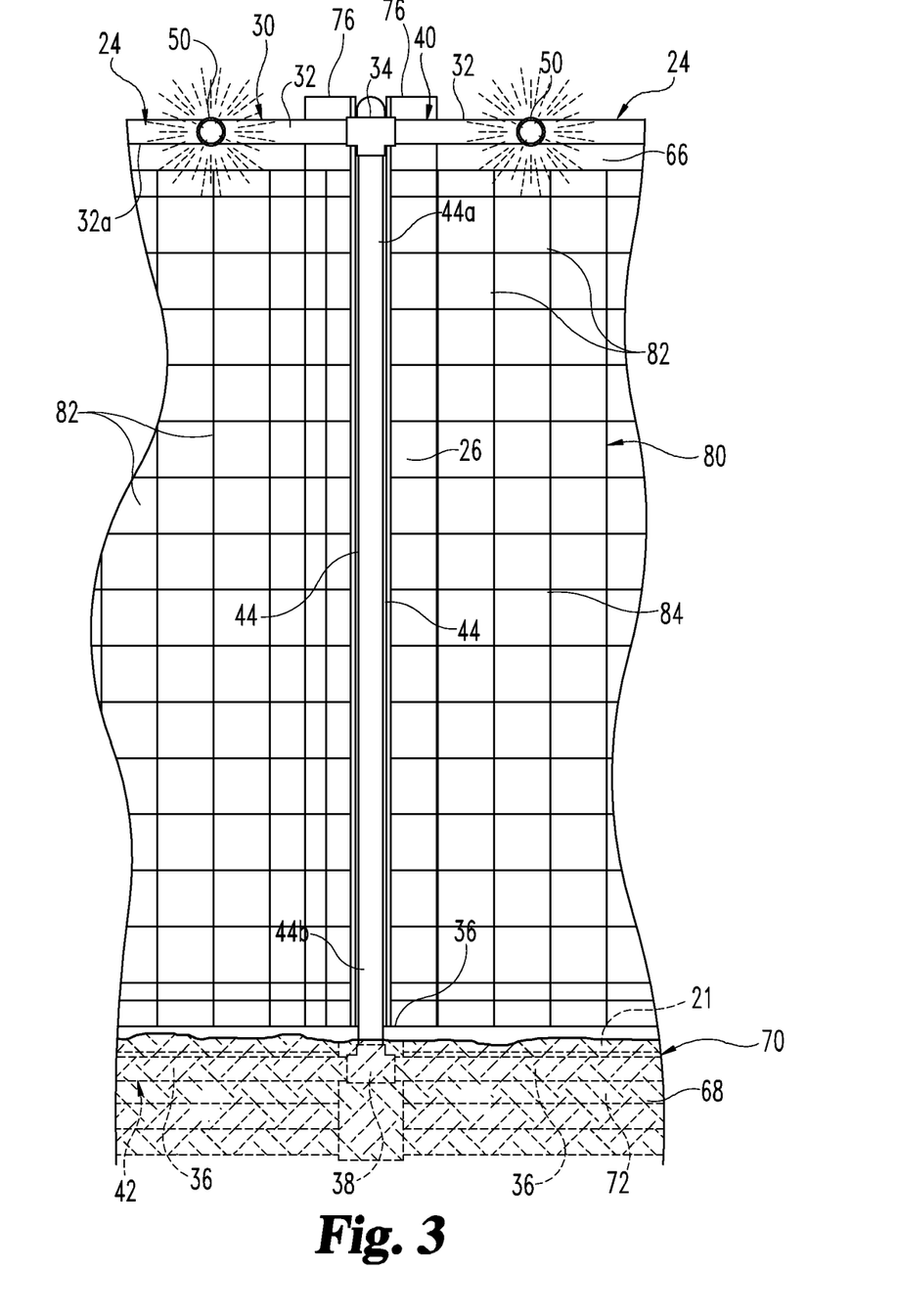
FIG. 3 is a partially diagrammatic exterior side view of a portion of the enclosure of FIGS. 1 and 2.
Figure 4:
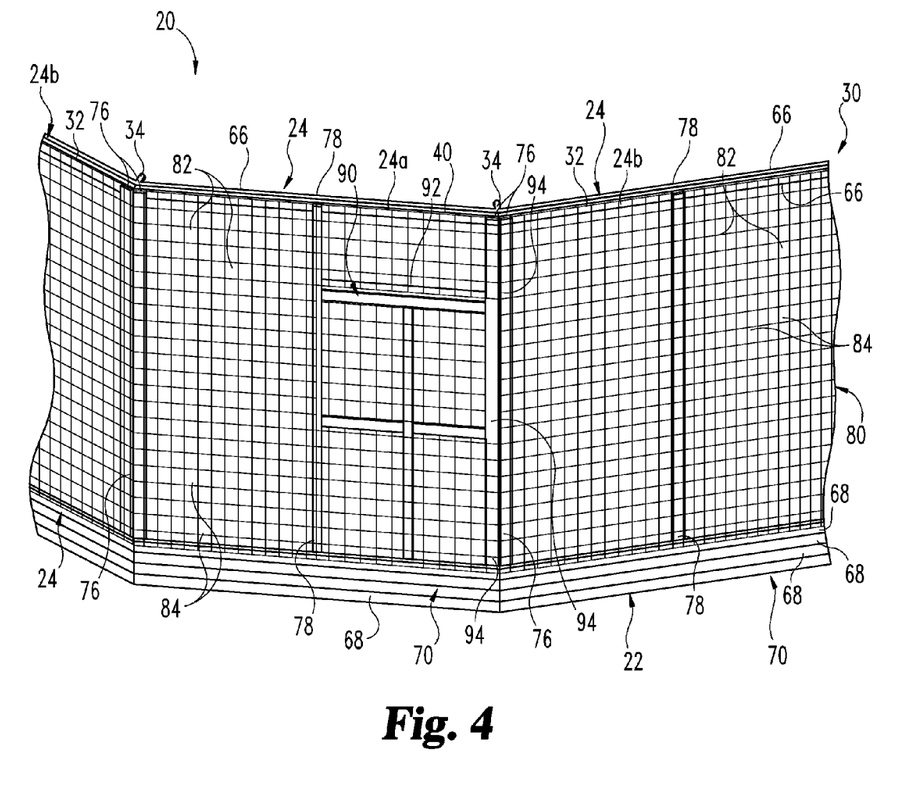
FIG. 4 is a partially diagrammatic interior side view of a portion of the enclosure of FIGS. 1-3, including a door and doorframe.

Each panel 24 also includes lower horizontally extending support members 68 (depicted in FIGS. 2-4). Lower support members 68 are further structured to lay out lower retaining wall 70. In a preferred embodiment, members 68 are comprised of pressure-treated landscaping ties. In other embodiments, members 68 may be in the form of boards, clapboarding, facing, sheeting, siding, or the like. Lower retaining wall 70 facilitates the formation of a raised bed of soil 21 for garden plot 72 along the lower part of enclosure 22. In a preferred embodiment, the lower end portion of vertically extending support members 76 are positioned interior to lower members 68 (and wall 70), and fastened thereto. In other embodiments, members 76 may be differently positioned relative too members 68 and/or may not be fastened.

For each panel 24, its pair of vertically extending support members 76 correspondingly align with adjacent vertically extending support members 76—one from each closest pair of opposing panels 24 (shown in FIGS. 1-4). These resulting eleven pairs of aligned vertical support members 76 (one from each adjacent panel 24) are preferably joined together to provide for a secure and stable structure of enclosure 22. Approximately midway between support members 76 of each panel 24 is a further vertically extending support member 78 that is rigidly joined to the corresponding upper horizontally extending support member 66 (see, for example, FIGS. 1, 2, and 4).

Figure 1:
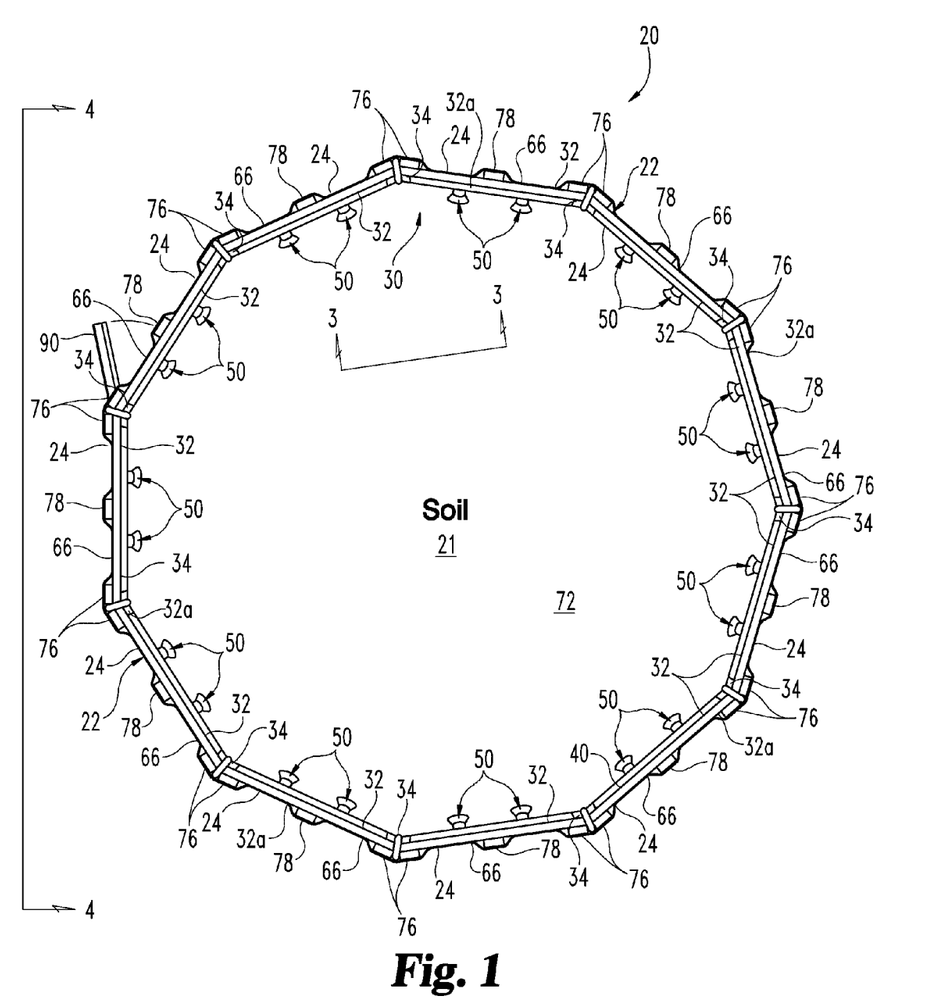
FIG. 1 is a partially diagrammatic top view of a garden watering enclosure of the present application.

Turning specifically to FIG. 4, a partial exterior side view of enclosure 22 is illustrated; where like features previously described are designated by like reference numerals. More specifically, FIG. 4 depicts portions of two panels 24 with a complete panel 24 therebetween. The complete panel 24 is further designated by reference numeral 24a and the two partial panels 24 are further designated by reference numeral 24b. Panel 24a includes certain unique features and panel 24b is configured in generally the same manner as all panels 24 except for panel 24a. Referring specifically to panel 24a, admission to the interior of enclosure 22 is provided by door 90. Door 90 is mounted in door frame 92 by hinges 94 to allow for pivotal opening and closing thereof. Door 90, door frame 92, and hinges 94 are structured in a standard manner. In FIGS. 1 and 2, door 90 is shown opened, and in FIG. 4 door 90 is shown closed. A vertical portion of door frame 92 may be provided by adjacent support member 76 to which hinges 94 are mounted. In contrast to panel 24a, panel 24b lacks door 90. Furthermore, the remaining panels 24 not shown in FIG. 4 are configured in the manner of panel 24b; however, in other embodiments, different panels 24 may include a door 90 or other variation as would occur to those skilled in the art. In one preferred embodiment, door 90, door frame 92, and members 66, 68, 76, and 78 are made of a treated lumber or other rigid, rot-resistant, and insect-resistant type of wood. Additionally or alternatively, these structures may be comprised of a composite, metal, organic polymer material, or combination of these. In other embodiments, these structural features may be made of a different material as would occur to those skilled in the art.

As best shown in FIGS. 3 and 4, along the outer (exterior) side of each panel 24 is barrier 80 in the form of grating 82. In the depicted embodiment, grating 82 is provided as screening mesh 84 that extends from one vertically extending support member 76 to the next for each panel 24. Likewise, grating 82/mesh 84 extends from member 68 to member 66 for each panel 24. For door 90, grating 82/mesh 84 is provided to complete barrier 80 when door 90 is closed, but does not bridge the door 90 and door frame 92 to permit pivotal opening thereof. Vertical support members 78 may provide additional support for barrier 80/grating 82. Barrier 80 is structured to admit, or is permissive of, air and light; but effective to exclude, reduce, and/or discourage intrusion by certain land animals. Such land animals include rabbits, deer, squirrels, rodents, and the like. In one preferred embodiment, grating 82 is metallic and is a form of 14 gauge or larger gauge fencing that is galvanized or otherwise composed to resist corrosion and the like. It has been discovered that fencing with a gauge at least this large lends strength to the structure of enclosure 22. In other embodiments, barrier 80 and/or grating 82 is provided in a different form as would occur to those skilled in the art.

System 20 further includes an enclosure-mounted watering subsystem 30 as illustrated in FIGS. 1-4. Subsystem 30 includes eleven upper horizontally extending conduit portions 32 in fluid communication with each other through eleven upper T-junctions 34, as perhaps best shown in FIG. 1. Upper T-junctions 34 each split a fluid input into two fluid outputs. Conduit portions 32 and junctions 34 may be shown in partial diagrammatic form. In one form, conduit portions 32 are made of one-half inch diameter PEX (cross-linked polyethylene) flexible hose 32a, for which junctions 34 are appropriately sized and configured. Each conduit portion 32 extends along the horizontally extending support member 66 of a different panel 24 and may be fixed relative thereto.

Subsystem 30 further includes eleven lower horizontally extending conduit portions 36 coupled together by a corresponding number of T-junctions 38 as perhaps best shown in FIG. 2. Portions 36 and junctions 38 may be above, on, or below the surface of soil 21 or a combination of these (the two portions 36 and junction 38 shown in FIG. 3 are depicted subsurface). Portions 36 and junctions 38 extend along wall 70 and may be secured thereto. In some embodiments, it may be desirable to fix portions 36 and/or junctions 38 to the interior of wall 70 if largely positioned above soil 21; however, in other embodiments subsystem 30 may be structured in a manner where not desirable.

Conduit portions 32 and junctions 34 are arranged to define an upper conduit distribution loop 40; and conduit portions 36 and junctions 38 are arranged to define a lower conduit distribution loop 42. Subsystem 30 also includes eleven vertically extending conduit portions 44. Loop 40 and loop 42 are in fluid communication with each other through vertically extending conduit portions 44 that are positioned interior to enclosure 22. Each conduit portion 44 ascends/descends where a different pair of adjacent panels 24 meet, as perhaps best shown in the partial interior side view of FIG. 3. Conduit portions 44 each extend along two vertical support members 76—each being from a different one of the pair of meeting panels 24 and are secured thereto. In one embodiment, vertically extending support members 76 are shaped to define a slot to receive conduit portion 44 that may be secured thereto. Conduit portions 44 are each connected to and in fluid communication with a corresponding upper junction 34 at an upper end 44a and to a corresponding lower junction 38 at a lower end 44b (see FIG. 3). It should be appreciated that while FIG. 3 only depicts the interior arrangement of enclosure 22 and subsystem 30 proximate to where two panels 24 meet, this arrangement generally repeats for each different pair of adjacent panels 24. In one nonlimiting form, conduit portions 36 are in the form of three-fourths inch diameter PEX flexible hose 36a, and conduit portions 44 are comprised of one half inch diameter PEX flexible hose 44c with junctions 38 appropriately sized and configured for the same.

As best shown in FIG. 1, each conduit portion 32 is in fluid communication with two adjustable spray or misting nozzles 50 resulting in a total of twenty-two about loop 40. Misting nozzles 50 are structured to provide an adjustable spray pattern, are repositionable on a ball-type joint or other similar arrangement, and are rated to at least 60 pounds per square inch (psi). However, in other embodiments some or all of nozzles 50 may be of a different number, different type, different structure, different rating, a combination of these, or as otherwise would occur to those skilled in the art. As shown in FIG. 2, loop 42 is further connected to a feeder T-junction 60 which feeds water from feeding conduit 101 as further described hereinafter. Feeding conduit 101 may be positioned under or over wall 70 or through an opening or slot formed in wall 70 (not shown). In one form, junction 60 is structured to connect a one inch diameter feeding conduit 101 to a three quarter inch diameter form of conduit portions 36.

Figure 5:
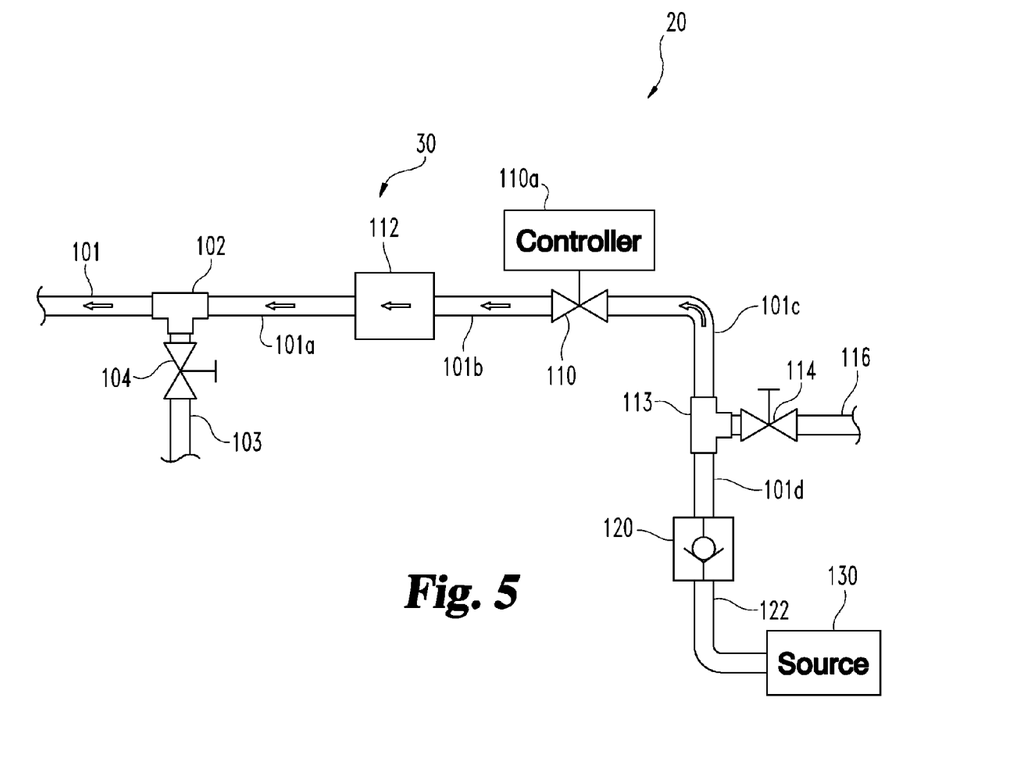
FIG. 5 is a schematic view of a liquid feeding subsystem for the enclosure of FIGS. 1-4.

Referring also to FIG. 5, subsystem 30 includes liquid feeding subsystem 100. Feeder subsystem 100 includes feeding conduit 101 that connects to and is in fluid communication with lower conduit distribution loop 42 of subsystem 30 through junction 60 (see FIG. 2). As schematically shown in FIG. 5, subsystem 100 includes T-junction 102 coupled in fluid communication between conduit 101 and conduit 101a. Junction 102 is also coupled to drain-down valve 104. Valve 104 selectively opens and closes a fluid communication passage between junction 102 and bibb 103. During normal operation of system 20, valve 104 is closed so that water received from conduit 101a (nominally upstream) is directed through junction 102 to conduit 101 (nominally downstream). The direction of hollow arrows shown in FIG. 5 correspond to the direction of flow during nominal operation. During a drainage mode of operation of system 20, valve 104 is opened to drain-out water from subsystem 30 via conduit 101 and/or 101a. Drainage may be desired to repair or maintain system 20, to winterize system by removing all the water that may potentially freeze over the winter season, or as otherwise desired. In other embodiments, junction 102 and valve 104 may be replaced by a three-way valve or such other alternative device(s) arranged to selectively direct water from conduit 101 to conduit 101a during a nominal mode of operation and to direct water through bibb 103 during a drainage mode of operation.

Feeder subsystem 100 further includes flow control valve 110 to regulate the flow of water delivered with misting nozzles 50 through subsystem 30. Valve 110 is regulated with a controller 110a that includes a valve control motor and wireless communication capability. Valve 110 is responsive to regulation by controller 110a in accordance with its operating logic. This operating logic may be configured to operate as a timer, function in response to one or more sensors (such as moisture sensors placed in soil 21), or as a remote control responsive to an operator interface to turn on/off the water flow and when on, modulate the amount of water provided with system 20. In one particular embodiment, controller 110a is responsive to a smart phone, tablet, computer or the like configured with a wireless control application. In one form of this embodiment, a smart phone control applet/application is provided that is operable with the IPHONE manufactured by APPLE and/or a similar type of smart phone or device.

Between junction 102 and valve 110 is an in-line fertilizer feeder 112 of subsystem 100. Feeder 112 may be manually operated and/or controlled with a timer or other device. Alternatively or additionally, feeder 112 may include multiple feed-through channels with or without the ability to select between them, including, but not limited to a bypass mechanism or the like. Feeder 112 may be of a type suitable to deliver chemicals carried with the water flow other than fertilizer (pesticide, herbicide, or the like) for provision with subsystem 30. Feeder 112 is coupled between conduit 101a and conduit 101b. Conduit 101b provides fluid communication between valve 110 and feeder 112, and conduit 101a provides fluid communication between junction 102 and feeder 112.

Nominally upstream of valve 110 is T-junction 113 coupled via conduit 101c that provides fluid communication therebetween. Junction 113 is also in fluid communication with conduit 101d (nominally upstream) and a blow-out valve 114. Valve 114 further carries bibb 116, and is closed during nominal operation. During a blow-out mode of operation, pressurized air can be applied through valve 114 into subsystem 100 to assist with clearing-out/draining of subsystem 30 by blowing liquid out of misting nozzles 50 and/or valve 104, for example. Alternatively or additionally, valve 114 may be configured for connection to an alternative water supply. Junction 113 is in fluid communication with backflow preventer 120 through interconnection by conduit 101d. Preventer 120 deters back flow of fluid through it, being illustrated as a form of check valve. Preventer 120 is in fluid communication with prime water source 130 via conduit 122 coupled therebetween. Source 130 may be a public or private utility, a pump-assisted and/or gravity-assisted well or spring, a storage tank (i.e., gravity fed, pumped, or otherwise), and/or such other type as would occur to those skilled in the art. Typically, source 130 can be turned off and on, so there may be a valve positioned between source 130 and conduit 122 (not shown). Correspondingly, the nominal direction of fluid flow is from conduit 122 to preventer 120, which deters the flow of liquid from subsystem 30 in the reverse direction. Preventer 120 further operates to support the use of valve 114 in connection with a blow-out mode of operation and/or as a coupling to an alternate water source.

Accordingly, during nominal operation, valves 104 and 114 are closed, and valve 110 is used to modulate the flow of water from source 130 through junctions 102 and 113, feeder 112, and backflow preventer 120 to feeding conduit 101. From conduit 101, water flow is delivered for distribution around lower conduit distribution loop 42, through vertically extending conduit portions 44 to upper conduit distribution loop 40 and out of misting nozzles 50. In one nonlimiting form, feeding subsystem 100 is made from one inch diameter interconnecting hoses, with valves 102, 110, and 114 appropriately sized and configured.

Any theory, thesis, hypothesis, mechanism of operation, proof, example, speculation, or finding stated herein is meant to further enhance understanding of one or more of the claimed inventions and is not intended to make any claimed invention in any way dependent upon or limited to such theory, thesis, hypothesis, mechanism of operation, proof, example, speculation, and/or finding. It should be understood that any use of the words "prefer, preferable, preferably, preferred, more preferred, and most preferred" as modifiers in the description above indicates that the feature so described may be desirable, and further may indicate different degrees of desirability; however, such description may nonetheless not be necessary and any embodiment lacking the same comes within the scope of any corresponding claimed invention of the present application, giving it the broadest reasonable construction. If any method claim follows, there is no intent that a particular order or sequence be imposed on any steps, strides, stages, phases, parts, facets, states, positions, junctures, aspects, conditions, conditionals, divisions, recitations, gerundial statements, nongerundial statements, operations, functions, developments, motions, movements, practices, happenings, responses, formations, compositions, utilizations, determinations, executions, routines, progressions, procedures, processes, preparations, exploits, doings, deeds, achievements, arrangements, creations, acts, and/or actions; or the like recited therein, except to the extent performance of a claimed feature requires performance of another claimed feature before or after it to avoid a nonsensical result when applying the broadest reasonable interpretation, or unless an order or sequence is expressly recited in the claim. There is no intent that a given feature of a claim be interpreted as a means or step for performing a specified function unless expressly indicated by recitation of the language "means for . . . " or "step for . . . " respectively. While representative embodiments have been illustrated and described in detail in the drawings and foregoing description, including any language under the section headings of Abstract, Background, Summary, Brief Description of the Drawing(s), Detailed Description of Representative Embodiments, and/or Experimental Example(s); the same is to be considered as illustrative and not restrictive in character, it being understood that only selected embodiments have been described, and that all changes, modifications, undescribed embodiments, and equivalents that come within the spirit of the invention(s) as defined herein or by any of the following claims are desired to be protected.

What is claimed is:
1. A method of enclosing a garden plot, comprising:
providing an enclosure about the garden plot, the enclosure including:
an enclosure frame including: a plurality of vertical support members extending between top and bottom ends, the vertical support members being separated from each other about the garden plot; and a plurality of horizontally extending support members; and
a barrier extending between said vertical support members and said horizontally extending support members, the barrier being at least partially permissive of light to the garden plot and at least partially preventing entry of land animals of interest to the garden plot;

supplying a liquid to a lower conduit distribution loop from a liquid supply conduit, said lower conduit distribution loop being positioned proximate to said bottom ends of said vertical support members and forming a continuous fluidic loop around the garden plot; conveying the liquid from the lower conduit distribution loop to an upper conduit distribution loop through a plurality of vertical risers extending therebetween, wherein the upper conduit distribution loop is positioned proximate to the top ends of the vertical support members and forms a continuous fluidic loop around the garden plot; and distributing the liquid from the upper conduit distribution loop to within the enclosure above the garden plot through a plurality of misting nozzles operably connected to the upper conduit distribution loop to water the garden plot.

2. The method of claim 1, wherein the barrier includes a form of mesh grating.

3. The method of claim 2, which includes:
controlling flow of the liquid to the misting nozzles with a valve in fluid communication with the liquid supply conduit.

4. The method of claim 3, which includes:
draining the lower conduit distribution loop and the upper conduit distribution loop with a drain down valve in fluid communication with the liquid supply conduit.

5. The method of claim 4, which includes:
blowing out the lower conduit distribution loop, the upper conduit distribution loop, and the vertical risers with a blow-out valve in fluid communication with the liquid supply conduit.

6. The method of claim 5, which includes:
preventing back flow from the lower conduit distribution loop, the upper conduit distribution loop, and the vertical risers with a backflow preventer in fluid communication with the liquid supply conduit.

7. The method of claim 1, which includes:
applying a pressurized gas through a blow-out valve in fluid communication with the liquid supply conduit to blow-out the lower conduit distribution loop, the upper conduit distribution loop, and the vertical risers.

8. The method of claim 1, which includes:
preventing back flow from the lower conduit distribution loop, the upper conduit distribution loop, and the vertical risers with a backflow preventer in fluid communication with the liquid supply conduit.

9. The method of claim 1, which includes:
during the supplying of the liquid from the liquid supply conduit, modulating flow amount of the liquid to the misting nozzles with a flow control valve in fluid communication with the liquid supply conduit.

10. The method of claim 1, which includes:
draining the lower conduit distribution loop and the upper conduit distribution loop with a drain down valve in fluid communication with the liquid supply conduit.

11. The method of claim 1, which includes:
providing a flow control valve including a controller;
sending a wireless communication to the controller; and
in response to the sending of the wireless communication, remotely controlling the watering of the garden plot with the flow control valve.

12. The method of claim 1, in which the watering of the garden plot includes:
modulating a water flow amount distributed through the misting nozzles with a flow control valve.

13. The method of claim 1, which includes:
performing the watering of the garden plot with a flow control valve, the flow control valve including a controller responsive to operating logic; and
in accordance with the operating logic; the controller directing operation of the flow control valve to perform one or more of the following acts: (a) timing the duration of the watering of the garden plot, (b) changing the on/off state of the watering of the garden plot, (c) modulating water amount provided by the watering of the garden plot, and (d) remotely controlling the watering of the garden plot with a device in wireless communication with the controller.

* * * * *